United States Patent
Zhou et al.

(10) Patent No.: US 12,399,710 B2
(45) Date of Patent: Aug. 26, 2025

(54) METHOD, APPARATUS, DEVICE, AND STORAGE MEDIUM FOR COMPATIBILITY OF SDK WITH ACCESS APPLICATION

(71) Applicant: CHINA UNIONPAY CO., LTD., Shanghai (CN)

(72) Inventors: Jien Zhou, Shanghai (CN); Yu Wang, Shanghai (CN); Wei Li, Shanghai (CN); Zhuo Chen, Shanghai (CN); Xi Shen, Shanghai (CN); He Huang, Shanghai (CN); Zhixiong Tang, Shanghai (CN); Zhimin Xie, Shanghai (CN); Ji Xia, Shanghai (CN); Yifan Hu, Shanghai (CN); Zhangyuan Ye, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 18/845,712

(22) PCT Filed: Aug. 29, 2022

(86) PCT No.: PCT/CN2022/115585
§ 371 (c)(1),
(2) Date: Nov. 5, 2024

(87) PCT Pub. No.: WO2023/168913
PCT Pub. Date: Sep. 14, 2023

(65) Prior Publication Data
US 2025/0199802 A1  Jun. 19, 2025

(30) Foreign Application Priority Data
Mar. 10, 2022  (CN) .......................... 202210238158.7

(51) Int. Cl.
G06F 8/71  (2018.01)

(52) U.S. Cl.
CPC ..................................... *G06F 8/71* (2013.01)

(58) Field of Classification Search
CPC .......................................................... G06F 8/71
See application file for complete search history.

(56) References Cited

U.S. PATENT DOCUMENTS 7,386,845 B1 *  6/2008  Fox .......................... G06F 8/61
  717/169
8,600,556 B2 * 12/2013  Nesler .................... G05B 11/01
  714/38.14

(Continued)

FOREIGN PATENT DOCUMENTS

CN  105141653 A  12/2015
CN  109814943 A   5/2019

(Continued)

OTHER PUBLICATIONS

The World Intellectual Property Organization (WIPO) International Search Report for PCT/CN2022/115585 Nov. 30, 2022 6 Pages (including translation).

*Primary Examiner* — Douglas M Slachta
(74) *Attorney, Agent, or Firm* — ANOVA LAW GROUP, PLLC

(57) ABSTRACT

A method for compatibility of an SDK with an access application includes transmitting to a management and control center bridge configuration information of an access application, the bridge configuration information representing configuration of an application function module of the access application; receiving a specific bridge issued by the management and control center and matched with the bridge configuration information, the specific bridge including a specific compatibility policy and SDK function modules, and the specific compatibility policy being used for carrying out specific processing on service parameters required by the application function module, so as to make the service (Continued)

parameters compatible with service parameters required by an SDK functional component in an SDK having a function corresponding to the application function module; mounting the specific bridge in the SDK; and when the access application runs the application function module, calling the corresponding SDK functional component by using the specific compatibility policy.

10 Claims, 8 Drawing Sheets

(56) References Cited

U.S. PATENT DOCUMENTS

| | | | | |
|---|---|---|---|---|
| 9,037,667 | B2* | 5/2015 | Rivkin | H04L 51/063 |
| | | | | 709/206 |
| 9,703,680 | B1* | 7/2017 | Chang | G06F 11/0784 |
| 10,114,950 | B2* | 10/2018 | Nalluri | G06F 21/563 |
| 11,989,558 | B2* | 5/2024 | Mohan | G06F 9/541 |
| 12,141,268 | B2* | 11/2024 | Rogers | G06F 21/53 |
| 2017/0060568 | A1* | 3/2017 | Seibert, Jr. | G06F 8/71 |
| 2017/0249139 | A1 | 8/2017 | Seibert, Jr. et al. | |
| 2017/0277800 | A1* | 9/2017 | Lucas | G06F 11/3698 |

FOREIGN PATENT DOCUMENTS

| | | | | | |
|---|---|---|---|---|---|
| CN | 110347445 | A | | 10/2019 | |
| CN | 112860457 | A | * | 5/2021 | G06F 8/30 |
| CN | 113934438 | A | * | 1/2022 | |
| CN | 109814943 | B | * | 4/2022 | |
| CN | 114637525 | A | | 6/2022 | |

* cited by examiner

METHOD, APPARATUS, DEVICE, AND STORAGE MEDIUM FOR COMPATIBILITY OF SDK WITH ACCESS APPLICATION

CROSS-REFERENCE TO RELATED APPLICATION

This application is a national phase entry under 35 U.S.C. § 371 of International Application No. PCT/CN2022/115585, filed on Aug. 29, 2022, which claims priority to Chinese patent application 202210238158.7 filed on Mar. 10, 2022, entitled "METHOD AND APPARATUS FOR COMPATIBILITY OF SDK WITH ACCESS APPLICATION, DEVICE AND MEDIUM," the entire content of all of which is incorporated herein by reference.

FIELD OF THE DISCLOSURE

The application generally relates to the field of data processing and, more particularly, relates to a payment method, apparatus, device and medium.

BACKGROUND

Software development kit (SDK) may encapsulate certain functions of a software. When an SDK is integrated with an access application, the access application may call the functions encapsulated in the SDK to perform services.

Since access applications of different access parties are different, there is a problem that an SDK is incompatible with different access applications. Professionals need to manually write codes for different access applications to make the SDK compatible. As the internal functions of an SDK become richer and more complex and the number of access applications increases, the workload of manual compatibility between the SDK and access applications is also increasing, and the efficiency of compatibility between the SDK and access applications is low.

SUMMARY

Embodiments of the present disclosure provide a compatibility method, apparatus, device and medium for an SDK with access applications, which may improve compatibility efficiency.

In a first aspect, embodiments of the present disclosure provide a compatibility method for an SDK with an access application, including: transmitting bridge configuration information of the access application to a management and control center, where the bridge configuration information indicates a configuration of an application function module in the access application; receiving a specific bridge, issued by the management and control center, that matches the bridge configuration information, where the specific bridge includes a specific compatibility policy and SDK functional components, the specific compatibility policy is used for a specific processing on service parameters required by the application function module to make the service parameters compatible with service parameters required by an SDK functional component, in the SDK, having a function corresponding to the application function module; mounting the specific bridge in the SDK; and when the access application runs the application function module, using the specific compatibility policy to call the corresponding SDK functional component.

In a second aspect, embodiments of the present disclosure provide a compatibility apparatus for an SDK with an access application, including: a transmitting module, configured to transmit bridge configuration information of the access application to a management and control center, where the bridge configuration information indicates a configuration of an application function module in the access application; a receiving module, configured to receive a specific bridge, issued by the management and control center, that matches the bridge configuration information, where the specific bridge includes a specific compatibility policy and SDK functional components, the specific compatibility policy is used for a specific processing on service parameters required by the application function module to make the service parameters compatible with service parameters required by an SDK functional component, in the SDK, having a function corresponding to the application function module; a mounting module, configured to mount the specific bridge in the SDK; and a calling module, configured to use the specific compatibility policy to call the corresponding SDK functional component when the access application runs an application function module.

In a third aspect, embodiments of the present disclosure provide an electronic device. The device includes: a processor and a memory storing computer program instructions; when the processor executes the computer program instructions, the compatibility method for the SDK with access application of the first aspect is implemented.

In a fourth aspect, embodiments of the present disclosure provide a computer-readable storage medium. Computer program instructions are stored on the computer-readable storage medium. When the computer program instructions are executed by a processor, the compatibility method for the SDK with the access application of the first aspect is implemented.

The embodiments of the present disclosure provide a compatibility method, apparatus, device and medium for an SDK with an access application, which may transmit the configuration of an application function module in an access application to a management and control center through bridge configuration information, and the management and control center issues a specific bridge matching the bridge configuration information. The specific bridge includes a specific compatibility policy and SDK functional components. The specific compatibility policy may perform a specific processing on the service parameters required by the application function module to make these service parameters compatible with the service parameters required by an SDK functional component, in the SDK, having a function corresponding to the application function module. Accordingly, it is possible to call the SDK functional component while the application function module is running. In this process, professionals do not need to manually write code for the SDK for compatibility, which reduces the workload required for compatibility between the SDK and access applications and improves compatibility efficiency.

BRIEF DESCRIPTION OF THE DRAWINGS

To explain the technical solutions of the embodiments of the present disclosure more clearly, the drawings required to be used in the embodiments of the present disclosure will be briefly introduced below. For a person skilled in the art, other drawings may be obtained based on these drawings without making creative efforts.

DETAILED DESCRIPTION

Figure 1:
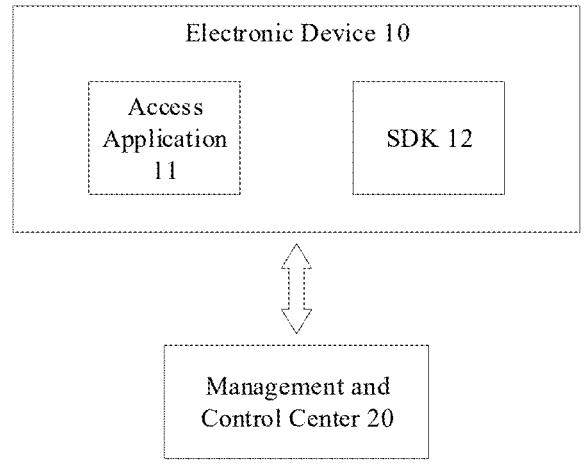
FIG. 1 is a schematic architectural diagram of an example application scenario of a compatibility method for an SDK with an access application in accordance with an embodiment of the present disclosure.

Features and exemplary embodiments of various aspects of the present disclosure will be described in detail below. To make the purpose, technical solutions and advantages of the present disclosure clearer, the present disclosure will be described in further detail below with reference to the accompanying drawings and specific embodiments. It should be understood that the specific embodiments described here are only intended to explain the present disclosure, but not to limit the disclosure. It will be apparent to one skilled in the art that the present disclosure may be practiced without some of these specific details. The following description of embodiments is merely intended to provide a better understanding of the present disclosure by illustrating examples thereof.

Developing software requires several processes such as editing, compiling, debugging, and running. During the development process, an SDK may be used to assist in software development. The SDK may include relevant documents, examples, tools, etc., that may realize software functions. Furthermore, the SDK may encapsulate certain functions of the software. When the SDK is integrated with an access application, the access application may call the functions encapsulated in the SDK to perform services. However, due to differences in the internal components of access applications of different access parties and the third-party libraries that need to be called, there is a problem of SDK incompatibility with different access applications. Professionals are required to target different access applications, and manually write code to obtain different versions of SDK that are compatible with different access applications. As the internal functions of an SDK become richer and more complex and the number of access applications increases, the workload of manual compatibility between the SDK and access applications is also increasing, and the efficiency of compatibility between the SDK and access applications is also low.

Embodiments of the present disclosure provide a method, apparatus, device and medium for compatibility between an SDK and an access application. Through the issuance and mounting of a specific bridge that matches the attributes of an application function module supported by the access application, when the application function module of the access application is running, a specific compatibility policy in the specific bridge is used to perform a specific processing on the service parameters required by the application function module, so that the processed service parameters are compatible with the service parameters required by an SDK functional component in the SDK. By loading a specific bridge that matches the configuration of the application function module, when the application function module and the SDK functional component are incompatible, the corresponding SDK functional component in the SDK may be called to implement the functions of the SDK functional component without the need for professionals manually writing code for the SDK for compatibility, which reduces the workload required for compatibility between the SDK and the access application and improves compatibility efficiency.

The compatibility method for an SDK with an access application in the embodiments of the present disclosure may be applied to a scenario of integration of SDK and access application, which may specifically involve an electronic device and a management and control center. FIG. 1 is a schematic architectural diagram of an example of an application scenario of a compatibility method for an SDK with an access application in accordance with an embodiment of the present disclosure. As shown in FIG. 1, the architecture system of the compatibility method for an SDK with an access application may include an electronic device 10 and a management and control center 20.

The electronic device 10 has an access application 11 and an SDK 12, and is a hardware device that carries the access application 11 and the SDK 12. The electronic device 11 may implement service functions by accessing the application 11 and SDK 12. The access application 11 is an application program of an access party, and the access application 11 itself may implement some services. In some embodiments, the functions in some services required by the access application 11 need to be completed by calling the functions of the SDK 12. The electronic device 11 may be a terminal device, a server, or other electronic devices, and the type and quantity of the electronic device 11 are not limited here.

The access application 11 may include more than one service module and more than one application function module. A service module is a component used to implement services. For example, a service module may include a transfer component, a loan application component, a people's livelihood expense payment component, etc. The transfer component may implement the transfer service, the loan application component may implement the loan application service, and the people's livelihood expense payment component may implement people's livelihood expense payment service. An application function module is a component used to implement lower-level functions in the services. For example, an application function module may include a network request function component, a file caching function component, etc. The network request function component may implement network request functions, and the file caching function component may implement file caching functions.

More than one function may be encapsulated in the SDK 12, and the functions encapsulated in SDK 12 may be implemented as SDK functional components. SDK functional components are components used to implement relatively low-level functions in the services. SDK functional components may include a network request functional component, a file caching functional component, etc. The network request functional component may implement network request functions, and the file caching functional component may implement file caching functions, but it should be noted that an SDK functional component in the SDK 12 may implement the same kind of functions as an application function module of the access application 11, but the service parameters required by the SDK functional component to implement functions may be different from the service parameters required by the application function module to implement the same type of functions. That is, the SDK functional component and application function module are not compatible. In the embodiments of the present disclosure, the SDK may be mounted with a specific bridge, and the specific bridge may eliminate or improve the incompatibility between an SDK functional component and an application function module.

The management and control center 20 may interact with the electronic device 10. The management and control center 20 may manage and store specific bridges. The management and control center 20 may issue a matching specific bridge to the electronic device 10 according to the attributes of an application function module supported by the access application in the electronic device 11. The management and control center 20 may include one management and control device, or may include two or more management and control devices. The type and quantity of the management and control devices in the management and control center 20 are not limited here.

The compatibility methods, apparatuses, devices and media for an SDK with an access application provided by the present disclosure will be described in turn below.

Figure 2:
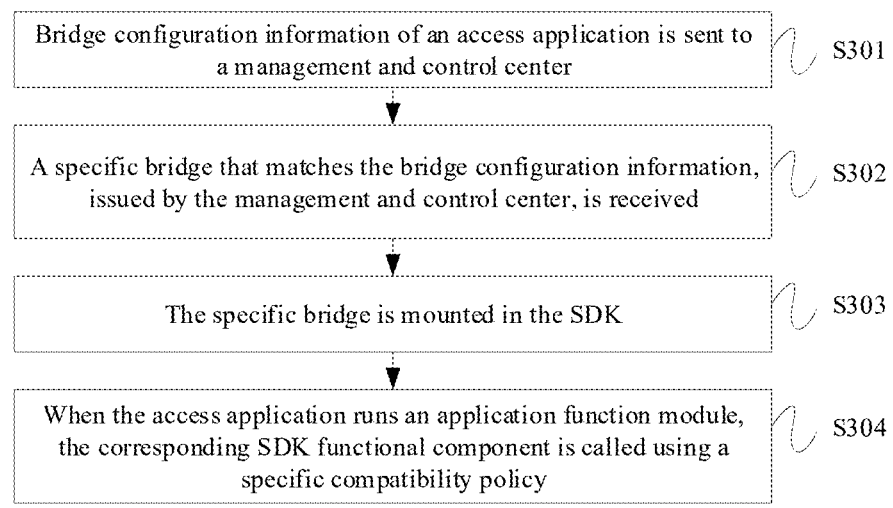
FIG. 2 is a flow chart of a compatibility method for an SDK with an access application in accordance with an embodiment of the present disclosure.

The present disclosure provides a compatibility method for an SDK with an access application, which may be applied to a compatibility apparatus or electronic device having the SDK and access application. That is, the compatibility method for the SDK with the access application may be implemented by the compatibility apparatus or electronic device having the SDK and access application. FIG. 2 is a flow chart of a compatibility method for an SDK with an access application in accordance with an embodiment of the present disclosure. As shown in FIG. 2, the compatibility method for an SDK with an access application may include steps S301 to S304.

In Step S301, bridge configuration information of an access application is sent to a management and control center.

The bridge configuration information represents the configuration of an application function module in an access application. The bridge configuration information is used to request the management and control center for a specific bridge that matches the bridge configuration information.

The configuration of an application function module in the access application may reflect the configuration required for the SDK by the application function module in the access application, thereby requesting a matching specific bridge from the management and control center through the bridge configuration information. In response to the bridge configuration information, the management and control center searches for a specific bridge that matches the bridge configuration information, and delivers the specific bridge that matches the bridge configuration information to a compatibility apparatus or electronic device having the access application and the SDK. Specifically, the compatibility apparatus or electronic device for the SDK with the access application may send the bridge configuration information to the management and control center during the compilation stage.

In some embodiments, the SDK may be provided with a module bridging layer, and the SDK may exchange data with the access application through the module bridging layer. The access application may configure the configuration information of an application function module to the SDK during the compilation phase, so that the SDK may generate bridge configuration information based on the configuration information of the application function module, and upload the bridge configuration information to the management and control center.

The configuration of an application function module in the access application may reflect function type, version, bridge type, etc. For example, the bridge configuration information includes the function type of the application function module, the version of the application function module, and the bridge type required by the application function module. In some embodiments, the function type of the application function module may be consistent with the function type of the specific bridge required by the application function module. Correspondingly, the function type of the application function module in the bridge configuration information may also be replaced by the function type of the specific bridge required by the application function module. In some embodiments, the version of the application function module may be consistent with the version of the specific bridge required by the application function module. Correspondingly, the version of the application function module in the bridge configuration information may also be replaced by the version of the specific bridge required by the application function module. The bridging type required by the application function module may represent the compatibility mode required by the application function module, such as what policy to use for compatibility, etc., which are not limited here.

For example, the bridge configuration information includes the function type "function" of the application function module, the version "targetVersion" of the application function module, and the bridge type "bridgeMode" required by the application function module. The function type "function" of an application function module is "payForBank", which means that the function type of the application function module is bank payment function. The version "targetVersion" of an application function module is "1.0.0", indicating that the version of the application function module is 1.0.0. The bridge type "bridgeMode" required by an application function module is "NET_REQUEST", indicating the specific bridge required by the application function module is a specific bridge compatible with the service parameters of network requests. The bridge type "bridgeMode" required by an application function module is "ENCRYPT_TYPE", indicating that the specific bridge required by the application function module is a specific bridge compatible with the service parameters of an encryption method. The encryption method may be as follows: irreversible encryption groups such as MD5 information digest algorithm, sha256, hash-based message authentication code (HMAC), etc., such as data encryption standard (DES), triple data encryption algorithm (3DES), advanced encryption standard (AES), etc., and asymmetric encryption groups such as Rivest-Shamir-Adleman (RSA). The specific encryption method in which policy group is selected may be defined by the access party in the bridge configuration information. The bridge type "bridgeMode" required by an application function module is "STORAGE_TYPE", which means that the specific bridge required by the application function module is a specific bridge compatible with the service parameters of the storage mode.

In Step S302, a specific bridge that matches the bridge configuration information, issued by the management and control center, is received.

A specific bridge may include a specific compatibility policy and an SDK functional component. The specific compatibility policy is used to perform a specific processing on the service parameters required by the application function module, so that these service parameters are compatible with the service parameters required by the SDK functional component, in the SDK, having a function corresponding to the application function module. The specific processing is related to the difference between the service parameters required by the application function module and the service parameters required by the SDK functional component. The specific processing is a processing to make up for the difference between the service parameters required by the application function module and the service parameters required by the SDK functional component.

In some embodiments, an application function module and SDK functional component that need to be compatible implement the same kind of functions. Compatibility here may include that the specifically processed service parameters required by the application function module are consistent or tend to be consistent with the service parameters required by the SDK functional component. The service parameters that are consistent or tend to be consistent here may mean that after the specific processing, the type of service parameters required by the application function module are consistent or tend to be consistent with the type of service parameters required by the SDK functional component. For example, the service parameters required by the application function module include Class A1 parameters, and the service parameters required by the SDK functional component include Class A1 parameters and Class A2 parameters. A specific compatibility policy may include methods for processing Class A1 parameters to obtain Class A1 parameters and Class A2 parameters. By processing the service parameters of the application function module through the specific compatibility policy, A1 type parameters and A2 type parameters are obtained. The A1 type parameters and A2 type parameters meet the needs of the SDK functional component for service parameters, so that the application function module may be compatible with the SDK functional component. Without manual recoding of the SDK, the SDK functional component in the SDK may be called normally through the specific bridge.

In some embodiments, a specific bridge corresponds to the type of function implemented by a target SDK functional component. The target SDK functional component is an SDK functional component that requires different service parameters from the service parameters required by an application function module that implements the same type of function. That is, the target SDK functional component is an SDK functional component that is incompatible with the application function module that implements the same type of function. Each specific bridge corresponds to a function. There is no need to call through a special bridge between inherently compatible SDK functional components and application function modules. For example, the access application includes 7 application function modules, named B1 to B7 respectively, and the SDK has 7 SDK functional components corresponding to the 7 application function modules, named C1 to C7 respectively. Among these components, the application function module B1 and the SDK functional component C1 are compatible. There is only a need for a specific bridge D1 corresponding to the application function module B2 and the SDK functional component C2, a specific bridge D2 corresponding to the application function module B3 and the SDK functional component C3, a specific bridge D3 corresponding to the application function module B4 and the SDK functional component C4, a special bridge D4 corresponding to the application function module B5 and the SDK functional component C5, a special bridge D5 corresponding to the application function module B6 and the SDK functional component C6, and a special bridge D6 corresponding to the application function module B7 and the SDK functional component C7.

In Step S303, the specific bridge is mounted in the SDK.

The specific bridge is mounted in the SDK. After mounting, the specific bridge is activated and may be called.

In some embodiments, the SDK may also include a universal compatibility component. A universal compatibility component includes a universal compatibility policy. The universal compatibility policy is used to universally process the service parameters required by the access application to make these service parameters compatible with the service parameters required by the SDK. Universal processing has no specificity, and the service parameters of each application function module of the access application are processed in the same way. The SDK has the same requirements for the service parameters of each SDK functional component. For example, a universal compatibility policy performs the same filtering operation on the service parameters required by the access application, filters out invalid service parameters and abnormal service parameters, and obtains valid service parameters. The valid service parameters meet the requirements of the SDK, that is, these parameters are compatible with the service parameters required by the SDK. Specifically, a specific bridge may be mounted on a universal compatibility component. After the specific bridge is mounted on the universal compatibility component, before calling the SDK functional component in the specific bridge, the universal compatibility component may be called to perform universal processing on the service parameters required by the access application.

Figure 3:
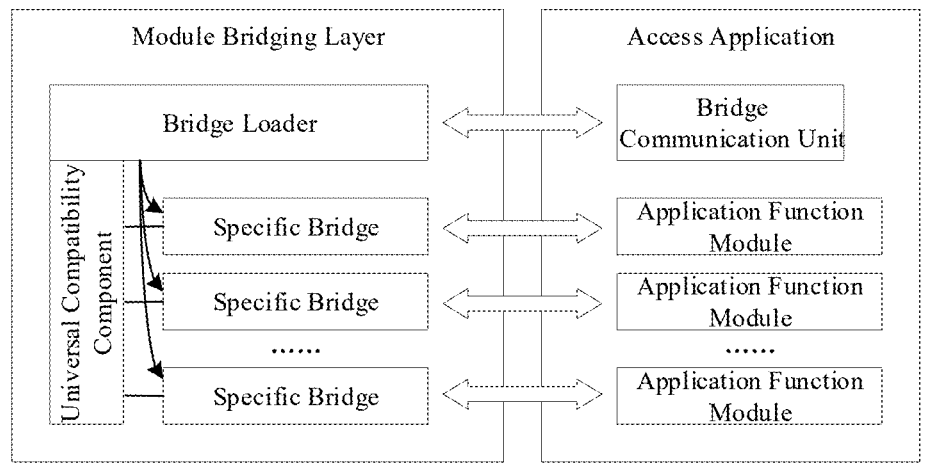
FIG. 3 is an architectural schematic diagram of an interaction between a module bridging layer and an access application in accordance with an embodiment of the present disclosure.

In some embodiments, the SDK may be provided with a module bridging layer, and the module bridging layer is configured to achieve compatibility between application function modules and SDK functional components. FIG. 3 is a schematic architectural diagram of an interaction between a module bridging layer and an access application in accordance with an embodiment of the present disclosure. As shown in FIG. 3, the module bridge layer includes a universal compatibility component and a bridge loader. The bridge loader may be thought of as a component that has the functionality to load a specific bridge. The bridge loader may mount a specific bridge, where an SDK functional component that implements the same type of functions as an application function module in the access application is located, on the universal compatibility component. The specific bridge may be functionally compatible with the application function module in the access application. More complex compatibility issues may be solved through the combination of one universal compatibility component and n specific bridges, where n is a positive integer. The bridge loader may also communicate with the access application. Specifically, the access application may be provided with a bridge communication unit, the bridge loader may perform data communication with the bridge communication unit, and the bridge loader may obtain the configuration information of an application function module of the access application through the bridge communication unit. According to the configuration information of the application function module, bridge configuration information is generated. The bridge loader may interact with the management and control center for data, send bridge configuration information to the management and control center during the compilation phase, and download specific bridges from the management and control center.

In Step S304, when the access application runs an application function module, the corresponding SDK functional component is called using a specific compatibility policy.

When an application function module is running, it needs to call an SDK functional component in the SDK that implements the same type of function as the application function module. Using a specific compatibility policy in the specific bridge to process the service parameters required by the application function module, the processed service parameters are the service parameters that meet the requirements of the SDK functional component, so that the SDK functional component may be called normally.

In some embodiments, the SDK has a bridge unified interface layer. The bridge unified interface layer is an interface layer between specific bridges and an access application. When the access application runs an application function module, it may interact with a specific bridge through the bridge unified interface layer. The access application does not need to know the bridging process of the specific bridge inside the SDK. The access application only needs to call the function required by the application function module at the bridge unified interface layer. Specifically, when the access application runs the application function module, the bridge unified interface layer of is accessed. The bridge unified interface layer calls a specific bridge that matches the application function module. The specific compatibility policy in the specific bridge is used to modify the service parameters provided by the application function module, so as to call the SDK functional component. The bridge unified interface layer is configured with a corresponding relationship between application function modules and specific bridges. This corresponding relationship may be delivered when the management and control center deliver a specific bridge to an SDK.

In the embodiments of the present disclosure, the configuration of an application function module in an access application may be transmitted to the management and control center through the bridge configuration information, and the management and control center issues a specific bridge that matches the bridge configuration information. The specific bridge includes a specific compatibility policy and SDK functional components. The specific compatibility policy may perform a specific processing on the service parameters required by the application function module to make these parameters compatible with the service parameters required by an SDK functional component, in the SDK, having a function corresponding to the application function module. Accordingly, it is possible to call the SDK functional component while the application function module is running. In this process, professionals do not need to manually write code for the SDK for compatibility, which reduces the workload required for compatibility between the SDK and access application and improves compatibility efficiency. Moreover, as the functional requirements for the SDK increase, the scale of the SDK becomes larger and larger. In the embodiments of the present disclosure, different SDK functional components may be categorized according to different specific bridges to realize modular calling of the SDK and minimize the size of the SDK. Moreover, the call to multiple SDK functional components is more flexible, which may meet the needs of different access parties for access applications and improve the compatibility of the SDK.

In some embodiments, a specific compatibility policy may be implemented as a bridging component, that is, a specific bridge may include a bridging component that includes the specific compatibility policy. Through the bridging component, the impact of the SDK environment on the compatibility of the access application may be reduced or even eliminated, so that the access application may correctly call the SDK functional component in the SDK through the bridging component. The bridging component may interact with the bridge unified interface layer, and the bridging component may receive the calling instruction and service parameters returned by the bridge unified interface layer. As the middleware between the bridge unified interface layer and the SDK functional component, the bridging component may perform functions such as parsing parameters and matching a method. Therefore, the bridging process and the call to the SDK functional component are imperceptible to the access application. SDK functional components that implement a same function may include at least one version of SDK functional component. In some embodiments, multiple versions of SDK functional components may be integrated into a specific bridge. For example, SDK functional components that implement the file caching function may include SDK functional component E1 of version 1.0, SDK functional component E2 of version 2.0, and SDK functional component E3 of version 3.0. Different versions of SDK functional components that implement the same function may require different service parameters and specific processing methods.

A specific bridge includes more than one version of bridging component and respective SDK functional components that are consistent with the versions of the bridging components. The bridging components and the SDK functional components appear in pairs. More than one version of bridging component in a specific bridge includes a bridging component whose version matches the bridge configuration information. In some embodiments, in order to save the storage space occupied by a specific bridge, the specific bridge may include a version of the bridging component and the SDK functional component that match the bridge configuration information, that is, the specific bridge includes a bridging component and an SDK functional component. In some embodiments, in order to improve the reliability of SKD being compatible with access applications, a specific bridge may include other versions of bridging components and SDK functional components in addition to one version of bridging component and SDK functional component that match the bridge configuration information. In this way, if the call of one version of the bridging component and SDK functional component that matches the bridge configuration information fails, it may try to call other versions of the bridging component and SDK functional component. For example, in addition to the matching version of the bridging component and the SDK functional component, the bridging component and the SDK functional component of a previous version that match the bridge configuration information may also be included. For another example, in addition to the version of the bridging component and the SDK functional component that matches the bridge configuration information, a specific bridge may also include the bridging component and the SDK functional component of a previous version and the bridging component and SDK function of a later version (of the version that matches the bridge configuration information).

Figure 4:
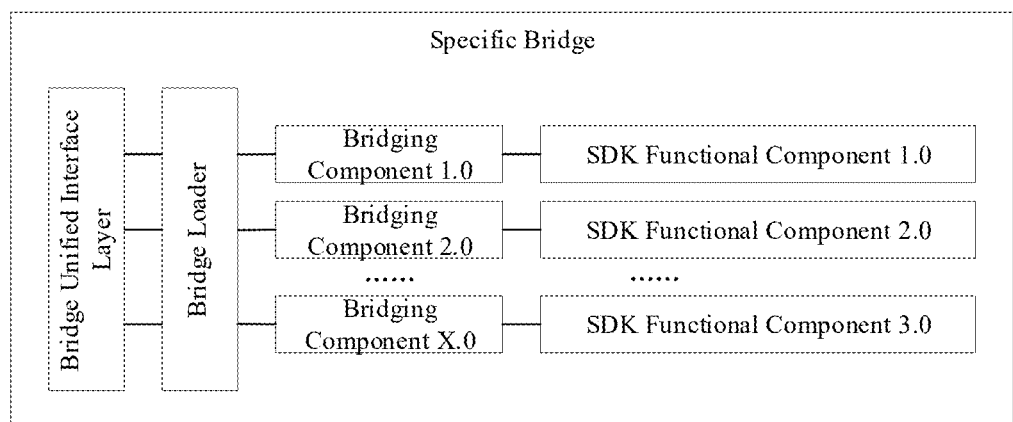
FIG. 4 is a schematic architectural diagram of a specific bridge in accordance with an embodiment of the present disclosure.

FIG. 4 is a schematic architectural diagram of a specific bridge in accordance with an embodiment of the present disclosure. As shown in FIG. 4, the specific bridge may be provided with a bridge unified interface layer and a bridge loader. The specific bridge may include bridging component 1.0, SDK functional component 1.0, bridging component 2.0, SDK functional component 2.0, . . . , bridging component X.0, and SDK functional component X.0. Here, 1.0, 2.0, and X.0 refer to the versions of the bridging component and the SDK functional component.

Figure 5:
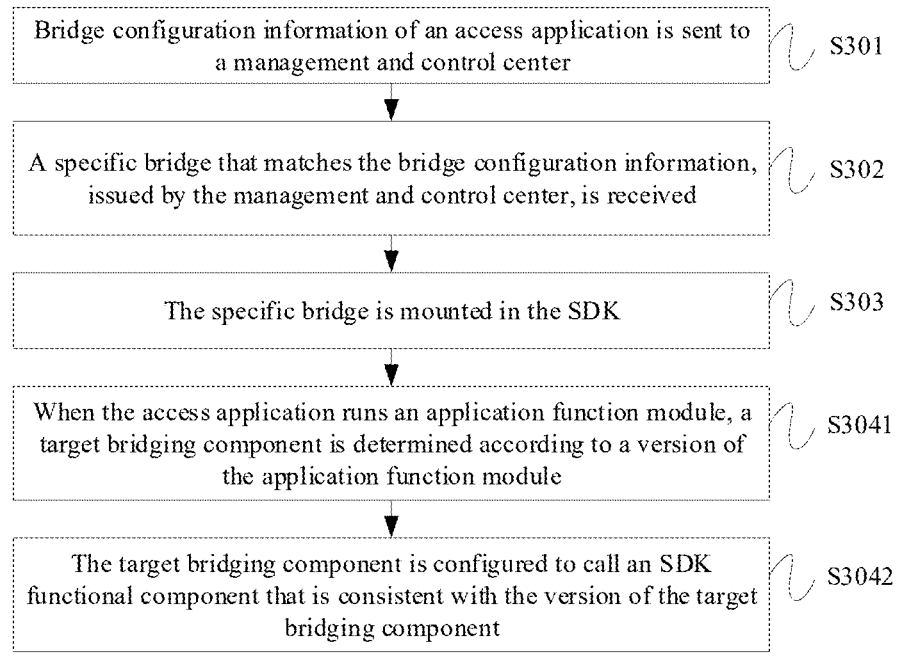
FIG. 5 is a flow chart of another compatibility method for an SDK with an access application in accordance with an embodiment of the present disclosure.

Correspondingly, when a specific bridge includes more than two versions of the bridging component and the SDK functional component, a bridging component that matches the version of the application function module may be called. FIG. 5 is a flow chart of another compatibility method for an SDK with an access application in accordance with an embodiment of the present disclosure. The difference between FIG. 5 and FIG. 2 is that Step S304 in FIG. 2 may be specifically refined into Step S3041 and Step S3042 in FIG. 5.

In Step S3041, when the access application runs an application function module, a target bridging component is determined according to a version of the application function module.

When the management and control center deliver a matching specific bridge according to the configuration of the application function module of the access application, the management and control center may also deliver a matching relationship between the versions of the application function modules and the versions of the bridging components. When running the application function module, the SDK may use the matching relationship to find a bridging component whose version matches the version of the application function module according to the version of the running application function module. That bridging component is the target bridging component, that is, the target bridging component is a bridging component whose version matches the version of the application function module.

In Step S3042, the target bridging component is configured to call an SDK functional component that is consistent with the version of the target bridging component.

The versions of bridging components and the corresponding SDK functional components are consistent. After determining the target bridging component, the SDK functional component whose version is consistent with the version of the target bridging component may be determined as the SDK functional component that needs to be called for the application function module to run.

Figure 6:
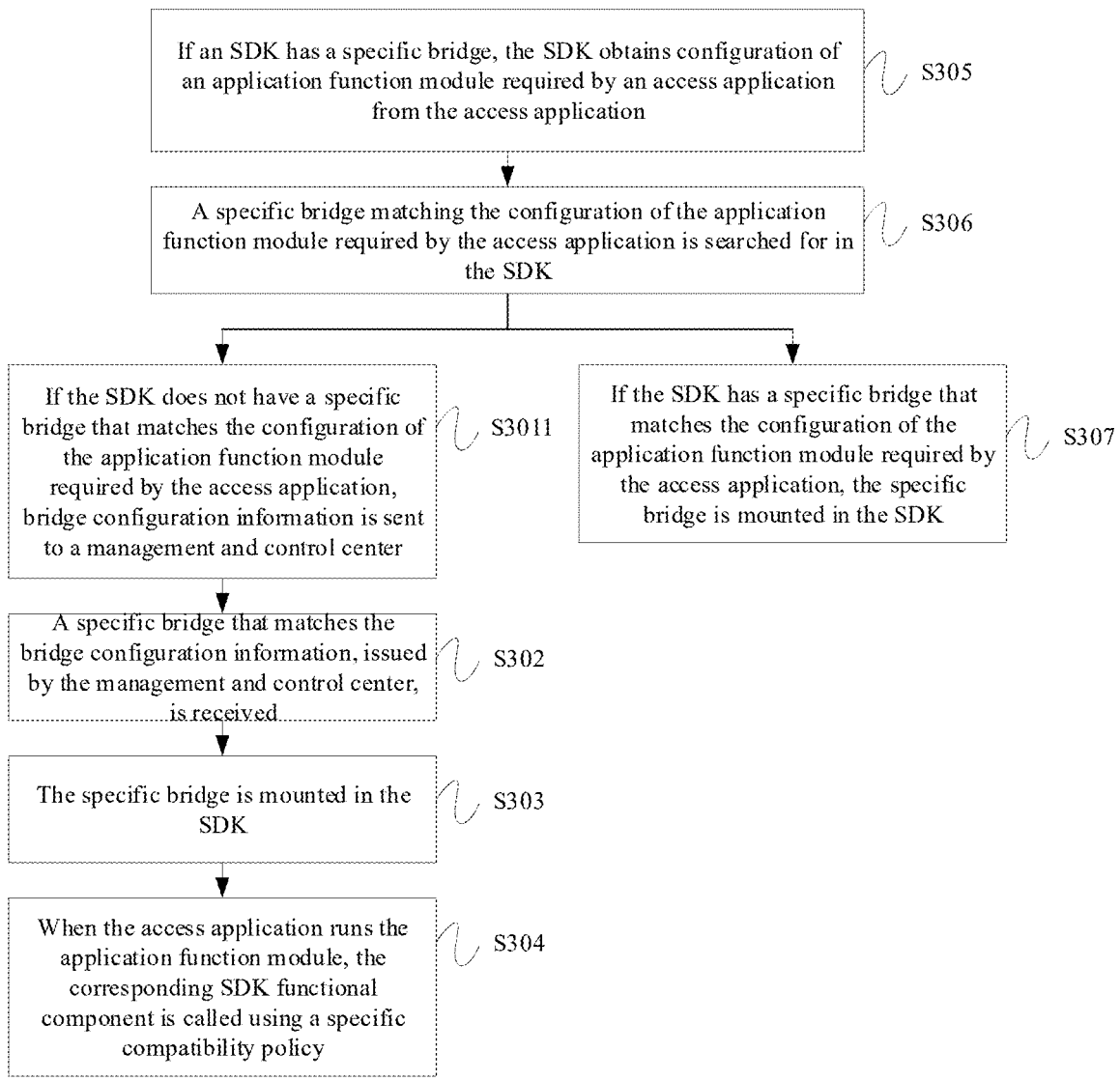
FIG. 6 is a flow chart of another compatibility method for an SDK with an access application in accordance with an embodiment of the present disclosure.

In some embodiments, since the access application may be updated, each time a person compiles, the person may first check whether the SDK has a required specific bridge locally. If the SDK has the required specific bridge locally, there is no need to request the management and control center to issue that specific bridge, which may save certain signaling. FIG. 6 is a flow chart of another compatibility method for an SDK with an access application in accordance with an embodiment of the present disclosure. The difference between FIG. 6 and FIG. 2 is that the compatibility method for an SDK with an access application shown in FIG. 6 may also include steps S305 to S307. Step S301 in FIG. 2 may be specifically refined into Step S3011 in FIG. 6.

In Step S305, if the SDK has a specific bridge, the SDK obtains the configuration of an application function module required by the access application from the access application.

The access application may communicate with the SDK through the module bridging layer in the SDK to transmit the configuration of the application function module in the access application.

In Step S306, a specific bridge matching the configuration of the application function module required by the access application is searched for in the SDK.

After the SDK obtains the configuration of the application function module required by the access application, it first searches the SDK for a specific bridge that matches the configuration of the application function module.

In Step S307, if the SDK has a specific bridge that matches the configuration of the application function module required by the access application, the specific bridge is mounted in the SDK.

If the SDK has a specific bridge that matches the configuration of the application function module, the specific bridge local to the SDK may be directly used.

In Step S3011, if the SDK does not have a specific bridge that matches the configuration of the application function module required by the access application, bridge configuration information is sent to the management and control center.

If a specific bridge that matches the configuration of the application function module does not exist locally in the SDK, the specific bridge is requested from the management and control center. If the management and control center does not have the specific bridge that matches the configuration of the application function module, the management and control center may send a loading exception notification message to the SDK of a compatibility apparatus or electronic device having the SDK and access application. The SDK may send a loading exception notification message, to notify a user that a loading exception occurs.

Figure 7:
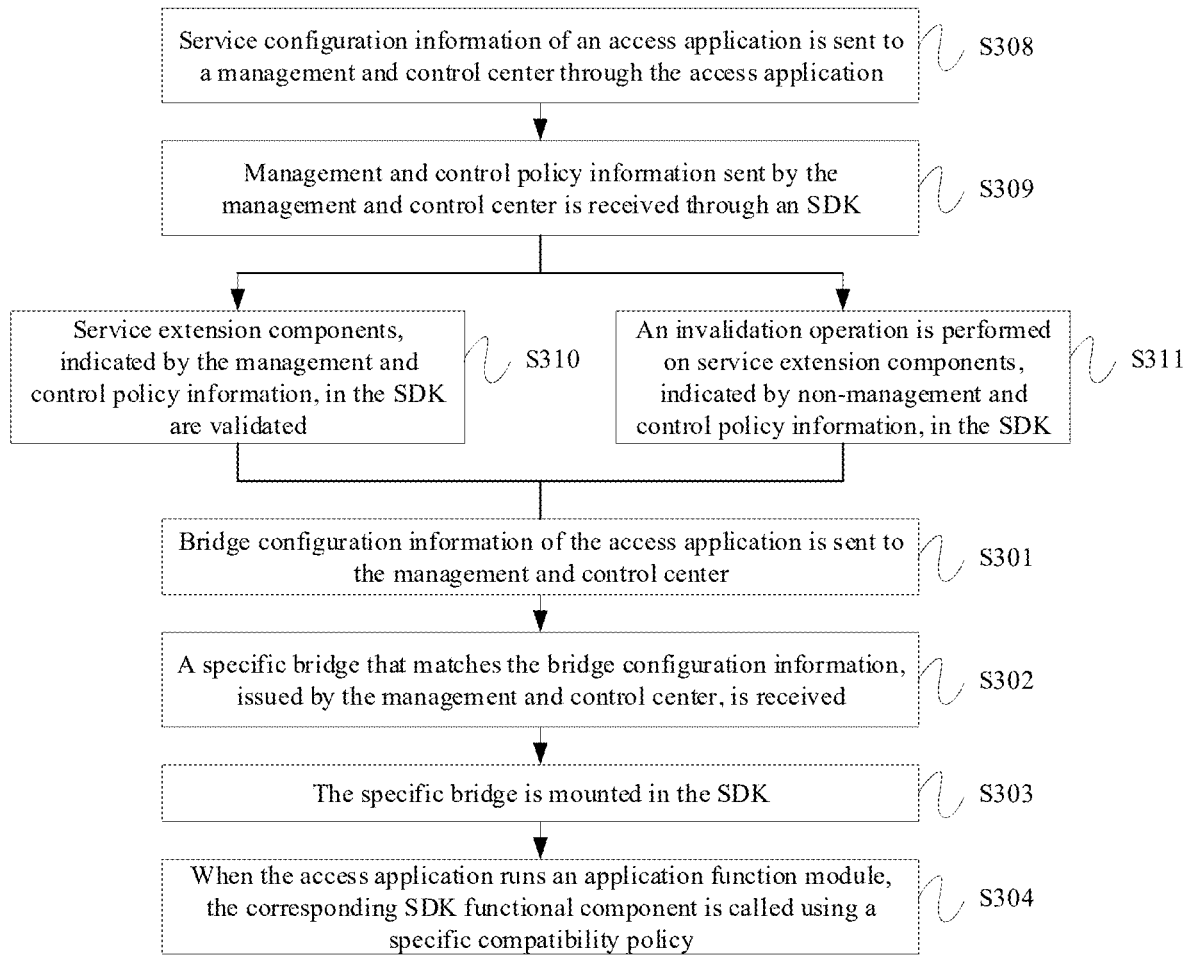
FIG. 7 is a flow chart of yet another compatibility method for an SDK with an access application in accordance with an embodiment of the present disclosure.

In some embodiments, the SDK also includes at least one service extension component. A service extension component is a functional component provided by the SDK for an access application to implement extended services. A service extension component in the SDK may be controlled to be valid or invalid according to the needs of the access application, so that the SDK may provide the access application with extended service functions required by the access application. FIG. 7 is a flow chart of yet another compatibility method for an SDK with an access application in accordance with an embodiment of the present disclosure. The difference between FIG. 7 and FIG. 2 is that the compatibility method for an SDK with an access application shown in FIG. 7 may also include steps S308 to S311.

In Step S308, service configuration information of the access application is sent to the management and control center through the access application.

The service configuration information indicates extended services required by an access application. An access application may upload its own needs for extended services to the management and control center through the service configuration information. The management and control center generates information indicating the service extension components that should be configured based on the extended services indicated by the service configuration information, and sends the information to the SDK in a compatibility apparatus or electronic device having the SDK and access application, so that the SDK may perform corresponding operations.

In some embodiments, before the access application in the compatibility apparatus or electronic device having the SDK and access application sends the service configuration information to the management and control center, the access application may log in to the management and control center and obtain the extended service list of the SDK from the management and control center. The extended service list includes extended services supported by the SDK. The compatibility apparatus or electronic device having the SDK and the access application may generate service configuration information based on the extended service list, where the extended services indicated by the service configuration information are at least part of the extended services in the extended service list.

In Step S309, management and control policy information sent by the management and control center is received through the SDK.

Management and control policy information is generated by the management and control center based on the service configuration information. The management and control policy information is used to indicate service extension components that match the extended services required by the access application.

In Step S310, service extension components, indicated by the management and control policy information, in the SDK are validated.

The SDK may locally store a plurality of service extension components. According to the management and control policy information, the service extension components indicated by the management and control policy information, in the plurality of service extension components, are enabled, that is, the service extension components indicated by the management and control policy information are validated. The validated service extension components may be called to implement corresponding extended services.

In some embodiments, a service extension component in the SDK may be associated with more than one application function module in the access application. That is, the extended service corresponding to the service extension component requires the assistance of the functions of more than one application function module to be implemented. When the extended service corresponding to the service extension component is executed, the application function modules associated with the service extension component may be run. Correspondingly, when the application function modules associated with the service extension component are run, the specific application function modules matching the application function module may be called. Specifically, the SDK functional component in the specific bridge may be called through the bridging component (i.e., the specific compatibility policy) in the specific bridge that matches the application function modules.

In Step S311, an invalidation operation is performed on service extension components, indicated by non-management and control policy information, in the SDK.

When the extended service corresponding to the service extension component that the access application needs to call is an extended service newly added by the access application, there is basically no need to invalidate the service extension component indicated by non-management and control policy information in the SDK. The service extension components in the SDK are invalid before they take effect. The service extension components indicated by the non-management and control policy information are the service extension components, in the SDK, excluding the service extension components indicated by the management and control policy information.

In some embodiments, after the version of the access application is updated, the required extended services may be reduced. Correspondingly, invalidating the service extension components indicated by the non-management and control policy information may enable the originally invalid service extension components to continue to be maintained. In the invalid state, the service extension components that were originally in the valid state but no longer belong to the service extension components indicated by the management and control policy information are switched to the invalid state. Invalid service extension components cannot be called.

The order of Step S308 to Step S311 and Step S301 to Step S304 is not limited here. Step S308 to Step S311 may be executed before Step S301 to Step S304, may be executed after Step S301 to Step S304, or may be executed with Step S301 to Step S304. Steps S301 to S304 are executed within the same period of time.

Figure 8:
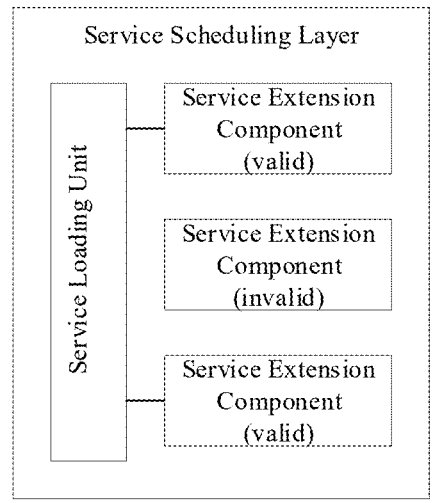
FIG. 8 is a schematic architectural diagram of a service scheduling layer in accordance with an embodiment of the present disclosure.

In some embodiments, the SDK may set up a service scheduling layer, and the service scheduling layer may be configured to manage external service management of the SDK. The service scheduling layer may include a service scheduling unit. FIG. 8 is a schematic architectural diagram of a service scheduling layer in accordance with an embodiment of the present disclosure. As shown in FIG. 8, the service scheduling layer may include a service loading unit. The service loading unit may interact with the management and control center and perform hot-swappable management of the service extension components according to the management and control policy information issued by the management and control center, for example, to validate a service extension component or load the extended service module, or to invalidate an extended service extension component or unload the service extension component. It should be noted that regardless of whether a service extension component is loaded or unloaded, the service extension component still exists in the SDK and will not be deleted from the SDK. The three service extension components in FIG. 8 include two valid service extension components and one invalid service extension component. Two valid service extension components may be called, and the invalid service extension component cannot be called.

In some embodiments, the service scheduling layer may also include a bridge scheduling unit, and the bridge scheduling unit may include a central communication subunit and a compatibility communication subunit. The central communication subunit is configured to communicate and interact with the management and control center. The compatibility communication subunit is configured for communication protection between the service scheduling layer and the module bridging layer in the SDK to ensure that the specific bridges in the module bridging layer are uniformly scheduled and match the application function modules in the access application.

In some embodiments, the access application has at least one service module. A service module is a native component of the access application and may implement the service functions of the access application. A service function may be associated with more than one application function module in the access application. That is, the service corresponding to a service module requires the assistance of more than one application function module to implement the service. When the service corresponding to the service module is executed, the application function modules associated with the service module may be run. Correspondingly, when the application function modules associated with the service module are run, specific bridges matching the application function modules may be called. Specifically, an SDK functional component in a specific bridge may be called through the bridging component (i.e., the specific compatibility policy) in the specific bridge that matches the application function module.

Figure 9:
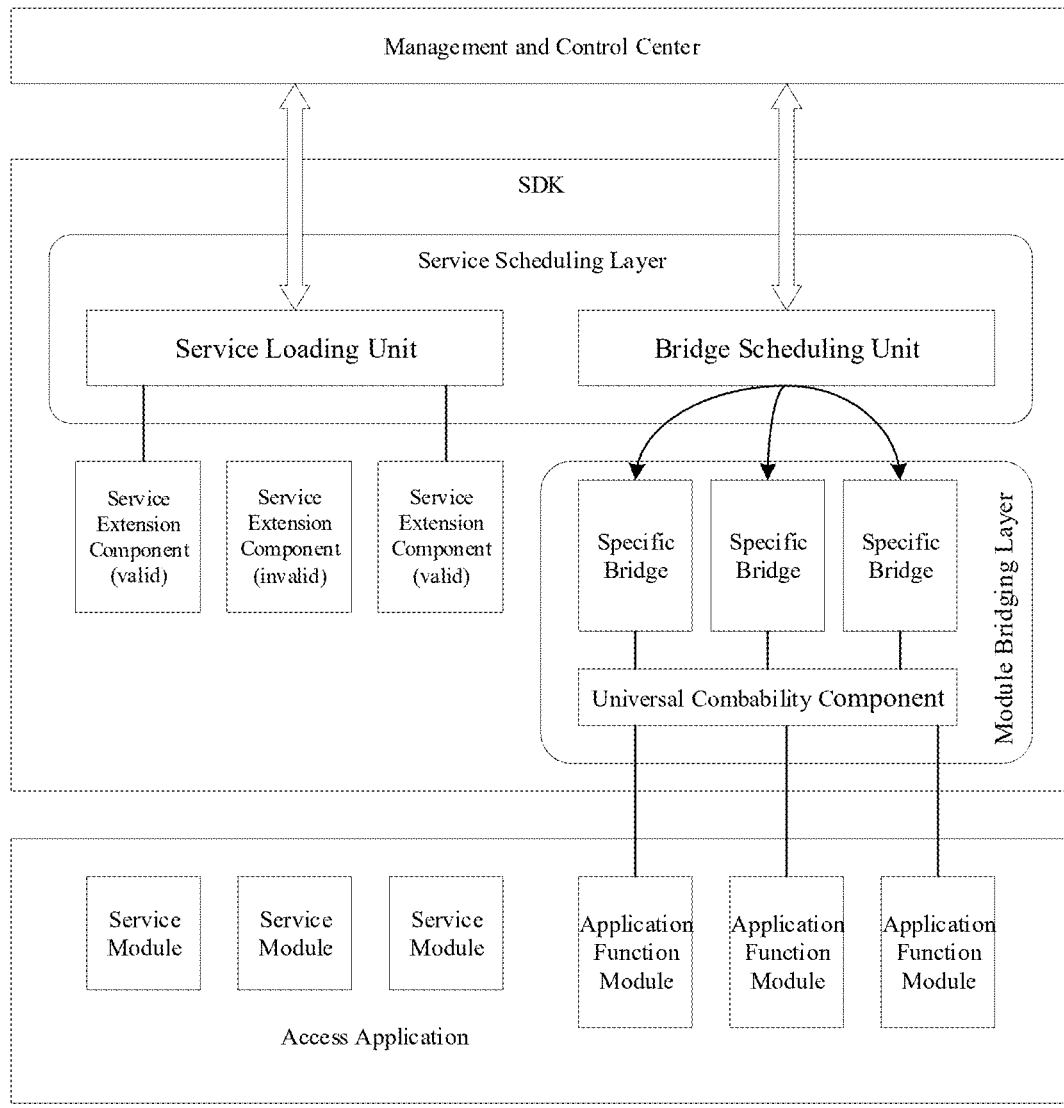
FIG. 9 is a schematic architectural diagram of an access application and SDK in accordance with an embodiment of the present disclosure.

To facilitate the explanation of the overall architecture of the access application and SDK, refer to FIG. 9. FIG. 9 is a schematic architectural diagram of an access application and SDK in accordance with an embodiment of the present disclosure. As shown in FIG. 9, the access application may include multiple service modules and multiple application function modules. The SDK includes a service scheduling layer and a module bridging layer. The service scheduling layer and the module bridging layer may each communicate and interact with the management and control center. The service scheduling layer includes a service loading unit and a bridge scheduling unit. The service loading unit may control the validation and invalidation of service extension components in the SDK. The bridge scheduling unit may perform unified scheduling on specific bridges. The module bridging layer is equipped with multiple specific bridges and a universal compatibility component. Multiple specific bridges may be mounted on the universal compatibility component. Multiple application function modules in the access application may call specific bridges that match the application function modules after calling the universal compatibility component.

Figure 10:
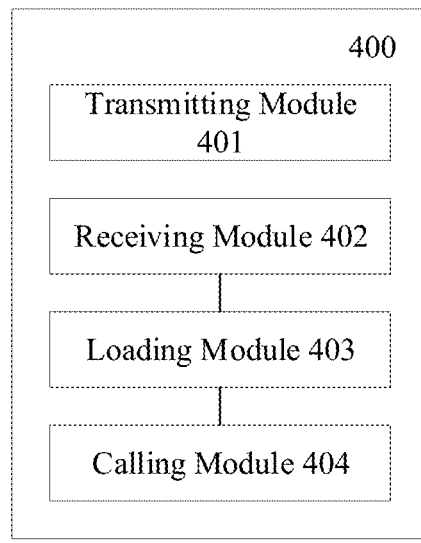
FIG. 10 is a schematic structural diagram of a compatibility apparatus for an SDK with an access application in accordance with an embodiment of the present disclosure.

The present disclosure also provides a compatibility apparatus for an SDK with an access application. FIG. 10 is a schematic structural diagram of a compatibility apparatus for an SDK with an access application in accordance with an embodiment of the present disclosure. As shown in FIG. 10, the compatibility apparatus 400 for an SDK with an access application may include a transmitting module 401, a receiving module 402, a mounting module 403 and a calling module 404.

The transmitting module 401 may be configured to send bridge configuration information of an access application to the management and control center.

The bridge configuration information represents the configuration of application function modules in the access application.

In some embodiments, the bridge configuration information includes a function type of the application function module, a version of the application function module, and a bridge type required by the application function module.

The receiving module 402 may be configured to receive a specific bridge issued by the management and control center that matches the bridge configuration information.

A specific bridge includes a specific compatibility policy and SDK functional components. The specific compatibility policy is used to perform a specific processing on the service parameters required by the application function modules, so that these processed service parameters are compatible with the service parameters required by an SDK functional component, in the SDK, having a function corresponding to the application function module.

In some embodiments, the specific bridge corresponds to the type of function implemented by a target SDK functional component. The target SDK functional component is an SDK functional component that requires service parameters different from the service parameters required by an application function module that implements the same type of function.

Mounting module 403 may be configured to mount a specific bridge in the SDK.

The calling module 404 may be configured to call the corresponding SDK functional component using a specific compatibility policy when the access application runs the application function module.

In the embodiments of the present disclosure, the configuration of an application function module in the access application may be transmitted to the management and control center through the bridge configuration information, and the management and control center issues a specific bridge that matches the bridge configuration information. The specific bridge includes a specific compatibility policy and SDK functional components. The specific compatibility policy may perform a specific processing on the service parameters required by the application function module to make these service parameters compatible with the service parameters required by an SDK functional component, in the SDK, having a function corresponding to the application function module. Thus, it is possible to call the SDK functional component while the application function module is running. In this process, professionals do not need to manually write code for the SDK for compatibility, which reduces the workload required for compatibility between the SDK and access application and improves compatibility efficiency. Moreover, as the functional requirements for the SDK increase, the scale of the SDK becomes larger and larger. In the embodiments of the present disclosure, different SDK functional components may be categorized according to different specific bridges to realize modular calling of the SDK and minimize the size of the SDK. Moreover, the call to multiple SDK functional components is more flexible, which may meet the needs of different access parties for access applications and improve the compatibility of the SDK.

In some embodiments, the SDK has a bridge unified interface layer.

The calling module 404 may be configured to: access the bridge unified interface layer when the access application runs the application function module; call the specific bridge that matches the application function module through the bridge unified interface layer; utilize the specific compatibility policy in the specific bridge to process the service parameters provided by the application function module to call the SDK functional component.

In some embodiments, SDK functional components that implement the same function include at least one version of SDK functional component. A specific bridge includes more than one version of the bridging component and SDK functional components consistent with the versions of the bridging components. More than one version of bridging component includes a bridging component whose version matches the bridge configuration information. Bridging components interact with the bridge unified interface layer. Bridging components include specific compatibility policies.

The calling module 404 may be configured to: when the access application runs the application function module, determine a target bridging component according to the version of the application function module, where the target bridging component is a bridging component whose version matches the version of the application function module; use the target bridging component to call the SDK functional component whose version is consistent with the version of the target bridging component.

In some embodiments, the SDK also includes a universal compatibility component. The universal compatibility component includes a universal compatibility policy. The universal compatibility policy is used to universally process the service parameters required by the access application to make these service parameters compatible with the service parameters required by the SDK.

The mounting module 403 may be configured to mount a specific bridge to the universal compatibility component in the SDK.

The calling module 404 may also be configured to call the universal compatibility component before calling the corresponding SDK functional component using a specific compatibility policy.

Figure 11:
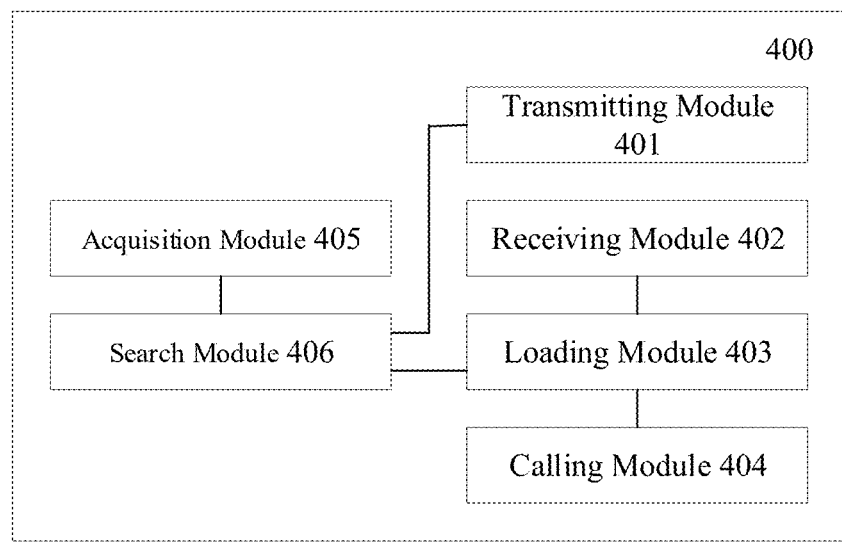
FIG. 11 is a schematic structural diagram of another compatibility apparatus for an SDK with an access application in accordance with an embodiment of the present disclosure.

FIG. 11 is a schematic structural diagram of another compatibility apparatus for an SDK with an access application in accordance with an embodiment of the present disclosure. The difference between FIG. 11 and FIG. 10 is that the compatibility apparatus 400 for an SDK with an access application shown in FIG. 11 may also include an acquisition module 405 and a search module 406.

The acquisition module 405 may be configured to obtain the configuration of an application function module required by the access application from the access application when the SDK has a specific bridge.

The search module 406 may be configured to search for a specific bridge in the SDK that matches the configuration of the application function module required by the access application.

The mounting module 403 may also be configured to mount the specific bridge in the SDK if the SDK has a specific bridge that matches the configuration of the application function module required by the access application.

The transmitting module 401 may also be configured to send bridge configuration information to the management and control center when the SDK does not have a specific bridge that matches the configuration of the application function module required by the access application.

Figure 12:
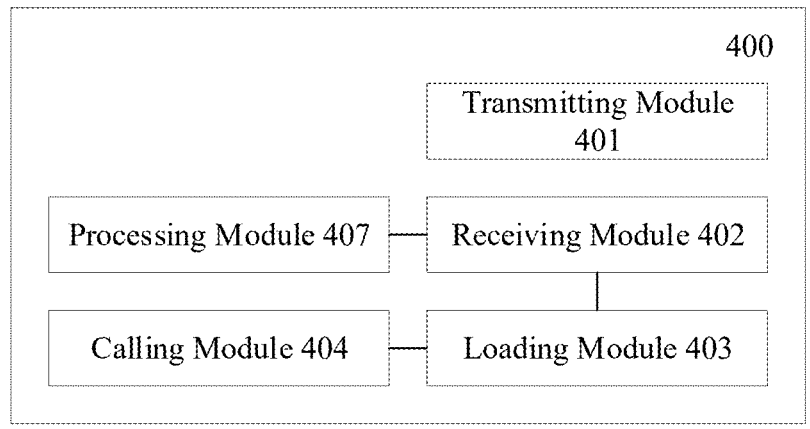
FIG. 12 is a schematic structural diagram of another compatibility apparatus for an SDK with an access application in accordance with an embodiment of the present disclosure.

FIG. 12 is a schematic structural diagram of another compatibility apparatus for an SDK with an access application in accordance with an embodiment of the present disclosure. The difference between FIG. 12 and FIG. 10 is that the compatibility apparatus 400 for an SDK with an access application shown in FIG. 12 may also include a processing module 407.

The transmitting module 401 may be configured to send the service configuration information of the access application to the management and control center through the access application.

The service configuration information indicates the extended services required by the access application.

The receiving module 402 may be configured to receive the management and control policy information sent by the management and control center through the SDK.

The management and control policy information is generated by the management and control center based on the service configuration information and is used to represent service extension components that match the extended services required by the access application. The SDK also includes at least one service extension component.

The processing module 407 may be configured to validate the service extension components indicated by the management and control policy information in the SDK.

The processing module 407 may also be configured to perform invalidation operations on service extension components indicated by the non-management and control policy information in the SDK.

In some embodiments, a service extension component is associated with more than one application function module.

The calling module 404 may also be configured to run the application function modules associated with the service extension component when the extended service corresponding to the service extension component is executed.

In some embodiments, the access application has at least one service module, and the service module is associated with more than one application function module.

The calling module 404 may also be configured to run the application function modules associated with the service module when executing the service corresponding to the service module.

Figure 13:
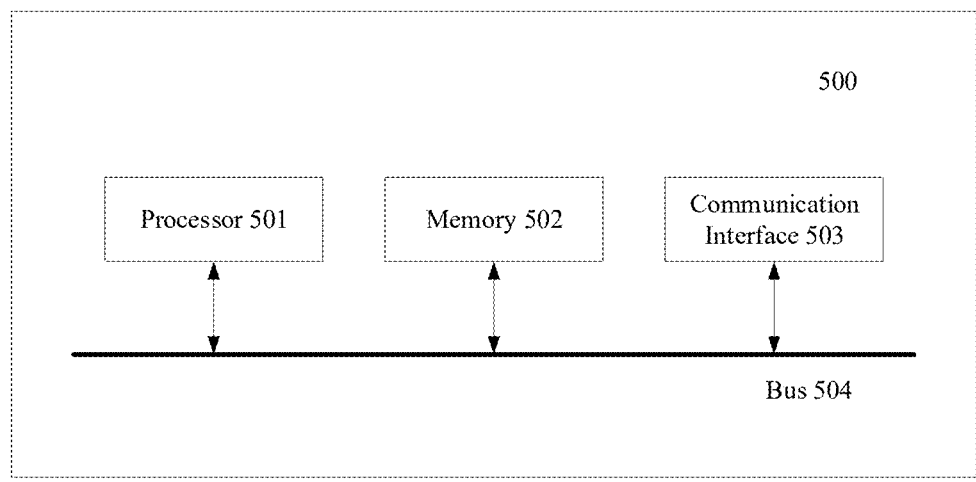
FIG. 13 is a schematic structural diagram of an electronic device in accordance with an embodiment of the present disclosure.

The present disclosure also provides an electronic device. FIG. 13 is a schematic structural diagram of an electronic device in accordance with an embodiment of the present disclosure. As shown in FIG. 13, the electronic device 500 includes a memory 501, a processor 502, and a computer program stored on the memory 501 and executable on the processor 502.

In some embodiments, the processor 502 may include a central processing unit (CPU), or an application specific integrated circuit (ASIC), or one or more integrated circuits that may be configured to implement embodiments of the present disclosure.

Memory 501 may include read-only memory (ROM), random access memory (RAM), magnetic disk storage media devices, optical storage media devices, flash memory devices, electrical, optical or other physical/tangible memory storage devices. Thus, generally, memory includes one or more tangible (non-transitory) computer-readable storage media (e.g., memory devices) encoded with software including computer-executable instructions, and when the software is executed (e.g., by one or multiple processors), it is operable to perform operations described with reference to the compatibility methods for an SDK with an access application in the above embodiments.

The processor 502 reads the executable program code stored in the memory 501 to run the computer program corresponding to the executable program code, to implement the compatibility methods for an SDK with an access application in the above embodiments.

In some embodiments, electronic device 500 may also include communication interface 503 and bus 504. Here, as shown in FIG. 13, the memory 501, the processor 502, and the communication interface 503 are connected through the bus 504 and complete communication with each other.

The communication interface 503 is mainly configured to implement communication between modules, devices, units and/or equipment in the embodiments of the present disclosure. Input devices and/or output devices may also be accessed through the communication interface 503.

Bus 504 includes hardware, software, or both, coupling the components of electronic device 500 to each other. By way of example, but not limitation, the bus 504 may include an accelerated graphics port (AGP) or other graphics bus, an enhanced industry standard architecture (EISA) bus, a front side bus (FSB), HyperTransport (HT) interconnect, industry standard architecture (ISA) bus, infinite bandwidth interconnect, low pin count (LPC) bus, memory bus, micro channel architecture, MCA) bus, peripheral component interconnect (PCI) bus, PCI-express (PCI-E) bus, serial advanced technology attachment (SATA) bus, video electronics standards association local bus (VLB) bus or other suitable buses or a combination of two or more of these. Where appropriate, bus 504 may include one or more buses. Although the embodiments of the present disclosure describe and illustrate a specific bus, the present disclosure contemplates any suitable bus or interconnection.

The present disclosure also provides a computer-readable storage medium. Computer program instructions are stored on the computer-readable storage medium. When the computer program instructions are executed by a processor, the compatibility methods for an SDK with an access application in the above embodiments may be implemented, and may achieve the same technical effect. To avoid repetition, the details will not be described again here. Here, the computer-readable storage media may include non-transitory computer-readable storage media, ROM, RAM, magnetic disks or optical disks, etc., which are not limited here.

The present disclosure also provides a computer program product. When the instructions in the computer program product are executed by the processor of the electronic device, the computer program product causes the electronic device to execute the compatibility methods for an SDK with an access application in the above embodiments, and may achieve the same technical effect. To avoid duplication, the details are not mentioned here.

It should be noted that the embodiments in the present disclosure are described in a progressive manner, and the same or similar parts between the various embodiments may be referred to each other. Each embodiment focuses on its differences from other embodiments. For apparatus embodiments, device embodiments, computer-readable storage medium embodiments and computer program product embodiments, relevant information may be found in the description of the method embodiments. The present disclosure is not limited to the specific steps and structures described above and illustrated in the drawings. Those skilled in the art may make various changes, modifications and additions, or change the order between steps after understanding the spirit of the present disclosure. Also, for the sake of brevity, detailed descriptions of known method techniques are omitted here.

Aspects of the present disclosure are described above with reference to flow chart illustrations and/or block diagrams of methods, apparatus (systems) and computer program products according to embodiments of the present disclosure. It will be understood that each block of the flow chart illustrations and/or block diagrams, and combinations of blocks in the flow chart illustrations and/or block diagrams, may be implemented by computer program instructions. These computer program instructions may be provided to a processor of a general purpose computer, special purpose computer, or other programmable data processing apparatus to produce a machine such that execution of the instructions via the processor of the computer or other programmable data processing apparatus enables implementation of the functions/actions specified in one or more blocks of a flow chart and/or block diagram. Such a processor may be, but is not limited to, a general-purpose processor, a special-purpose processor, a special application processor, or a field-programmable logic circuit. It will also be understood that each block in the block diagrams and/or flow chart illustrations, and combinations of blocks in the block diagrams and/or flow chart illustrations, may also be implemented by special purpose hardware that performs the specified functions or actions, or may be implemented by special purpose hardware and a combination of computer instructions.

Those skilled in the art should understand that the above embodiments are illustrative rather than restrictive. Different technical features appearing in different embodiments may be combined to achieve beneficial effects. Those skilled in the art should be able to understand and implement other modified embodiments of the disclosed embodiments based on understanding the drawings, description and claims. In the claims, the term "comprising" does not exclude other means or steps; the term "a" does not exclude a plurality; the terms "first" and "second" are used to indicate names rather than to indicate any specific order. Any reference signs in the claims shall not be construed as limiting the scope. The functions of several parts appearing in the claims may be implemented by a single hardware or software module. The appearance of certain technical features in different dependent claims does not mean that these technical features cannot be combined to achieve beneficial effects.

What is claimed is:

1. A compatibility method for a software development kit (SDK) with an access application, comprising:
    transmitting bridge configuration information of the access application to a management and control center, wherein the bridge configuration information indicates a configuration of an application function module in the access application;
    receiving a specific bridge, issued by the management and control center, that matches the bridge configuration information, wherein the specific bridge includes a specific compatibility policy and SDK functional components, the specific compatibility policy is used for a specific processing on service parameters required by the application function module to make the service parameters compatible with service parameters required by an SDK functional component, in the SDK, having a function corresponding to the application function module;
    mounting the specific bridge in the SDK; and
    when the access application runs the application function module, using the specific compatibility policy to call the corresponding SDK functional component,
    wherein the SDK further includes a universal compatibility component, the universal compatibility component includes a universal compatibility policy, and the universal compatibility policy is used to universally process service parameters required by the access application, making the processes service parameters compatible with service parameters required by the SDK, and
    mounting the specific bridge in the SDK includes:
    in the SDK, mounting the specific bridge to the universal compatibility component; and
    before calling the corresponding SDK functional component using the specific compatibility policy, the method further includes:
    calling the universal compatibility component.

2. The method according to claim 1, wherein the SDK has a bridge unified interface layer, and when the access application runs the application function module, using the specific compatibility policy to call the corresponding SDK functional component comprises:
    when the access application runs the application function module, accessing the bridge unified interface layer;
    calling a specific bridge matching the application function module by the bridge unified interface layer; and using a specific compatibility policy in the specific bridge matching the application function module to process the service parameters provided by the application function module to call the SDK functional component.

3. The method according to claim 1, wherein SDK functional components that implement a same function include one or more versions of SDK functional components, and the specific bridge includes one or more versions of bridging components and SDK functional components consistent with the versions of the bridging components, the one or more versions of bridging components include a bridging component whose version matches the bridge configuration information, the bridging component interacts with a bridge unified interface layer, and the bridging component includes the specific compatibility policy, and when the access application runs the application function module, using the specific compatibility policy to call the corresponding SDK functional component includes:

when the access application runs the application function module, determining a target bridging component according to a version of the application function module, wherein the target bridging component is a bridging component whose version matches the version of the application function module; and using the target bridging component to call an SDK functional component whose version is consistent with the version of target bridging component.

4. The method according to claim 1, further comprising:

when the SDK has specific bridges, the SDK obtains, from the access application, configuration of an application function module required by the access application;

searching the SDK for a specific bridge that matches the configuration of the application function module required by the access application; and when the SDK has the specific bridge that matches the configuration of the application function module required by the access application, mounting the specific bridge in the SDK, wherein transmitting the bridge configuration information of the access application to the management and control center includes:

when the SDK does not have the specific bridge that matches the configuration of the application function module required by the access application, transmitting the bridge configuration information to the management and control center.

5. The method according to claim 1, wherein the specific bridge has a one-to-one correspondence with a type of function implemented by a target SDK functional component, and the target SDK functional component is an SDK functional component that requires different service parameters from service parameters required by an application function module that implements a same type of function.

6. The method according to claim 1, wherein the bridge configuration information includes a function type of the application function module, a version of the application function module, and a bridge type required by the application function module.

7. The method according to claim 1, wherein the SDK further includes at least one service extension component, and the method further comprises:

sending service configuration information of the access application to the management and control center through the access application, wherein the service configuration information indicates extended services required by the access application;

receiving management and control policy information sent by the management and control center through the SDK, wherein the management and control policy information is generated by the management and control center according to the service configuration information and is used to indicate service extension components that match the extended services required by the access application; and validating the service extension components indicated by the management and control policy information in the SDK.

8. The method according to claim 7, further comprising:

performing an invalidation operation on service extension components in the SDK that are not indicated by the management and control policy information.

9. The method according to claim 7, wherein the service extension component is associated with more than one application function module, and the method further comprises:

when extended services corresponding to the service extension component are executed, running the more than one application function module associated with the service extension component.

10. The method according to claim 1, wherein the access application has at least one service module, and the service module is associated with more than one application function module, and the method further comprises:

when services corresponding to the service module are executed, running the more than one application function module associated with the service module.

* * * * *